United States Patent Office 2,929,366
Patented Mar. 22, 1960

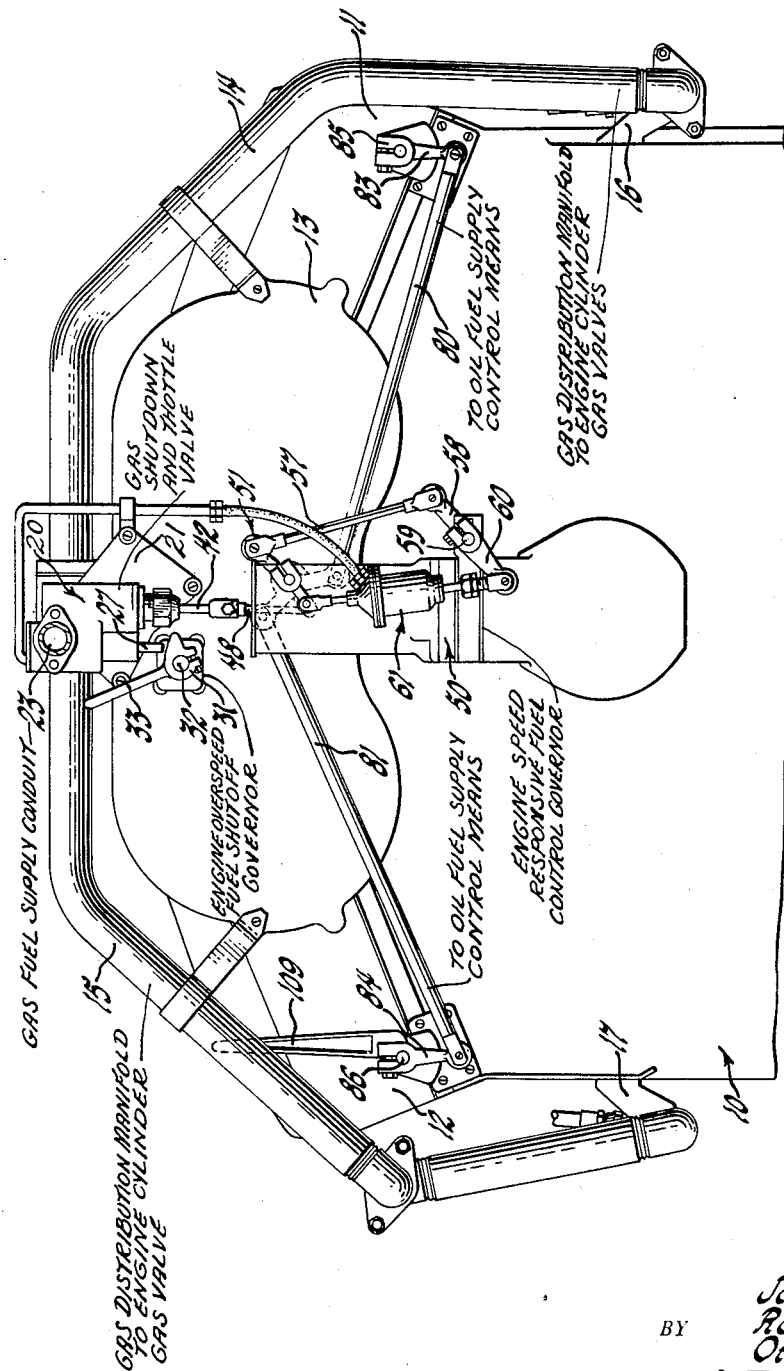

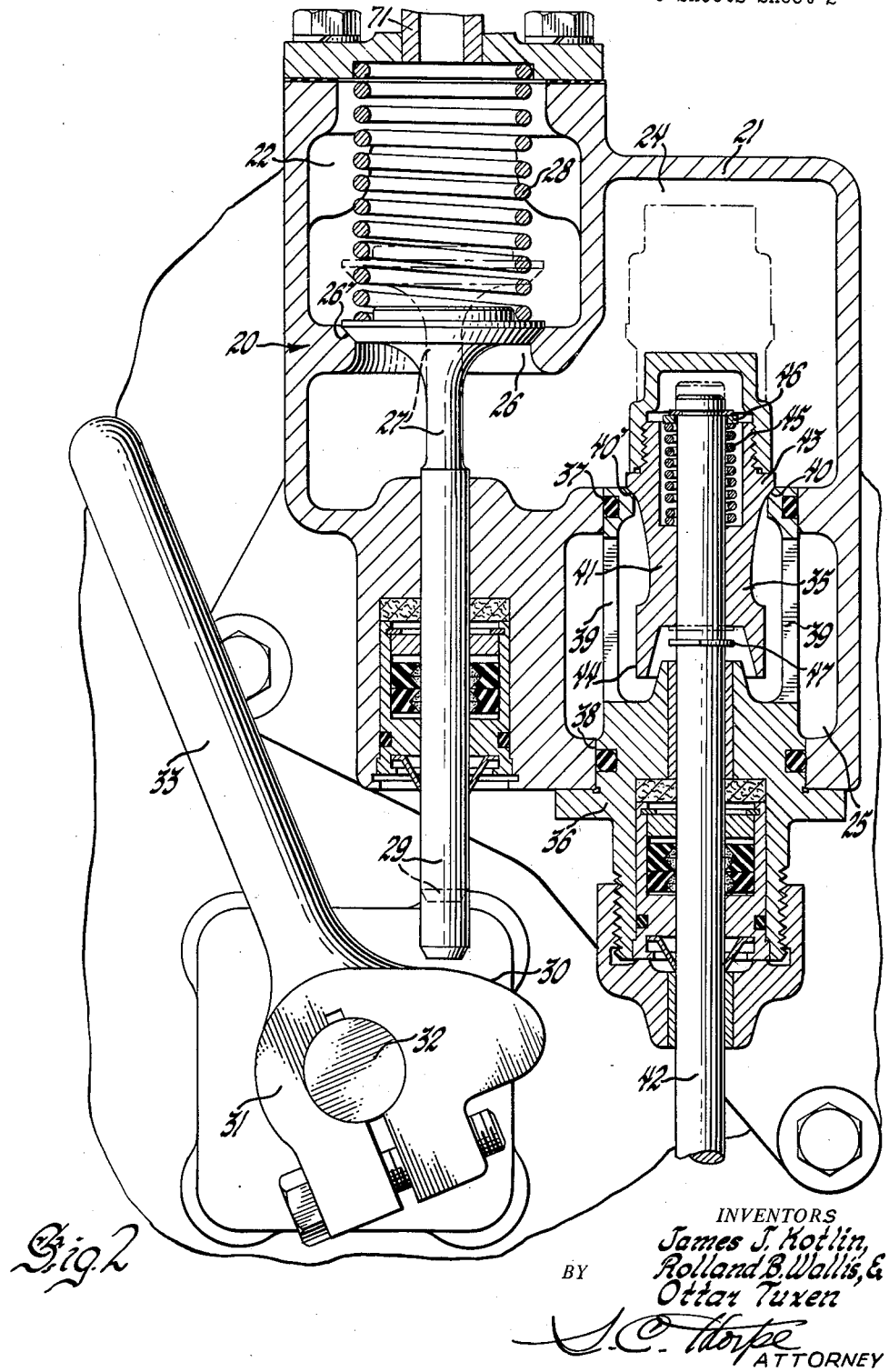

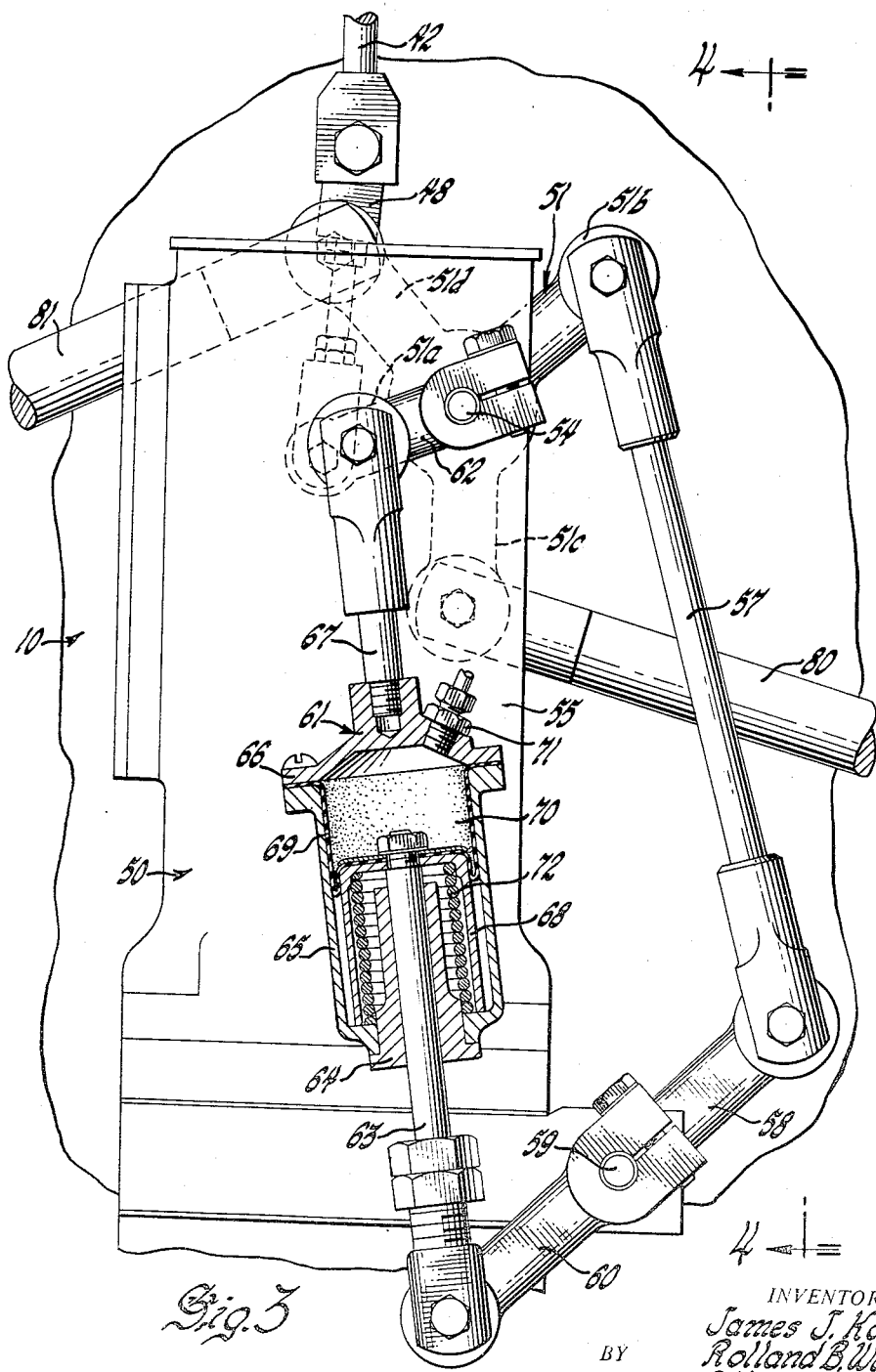

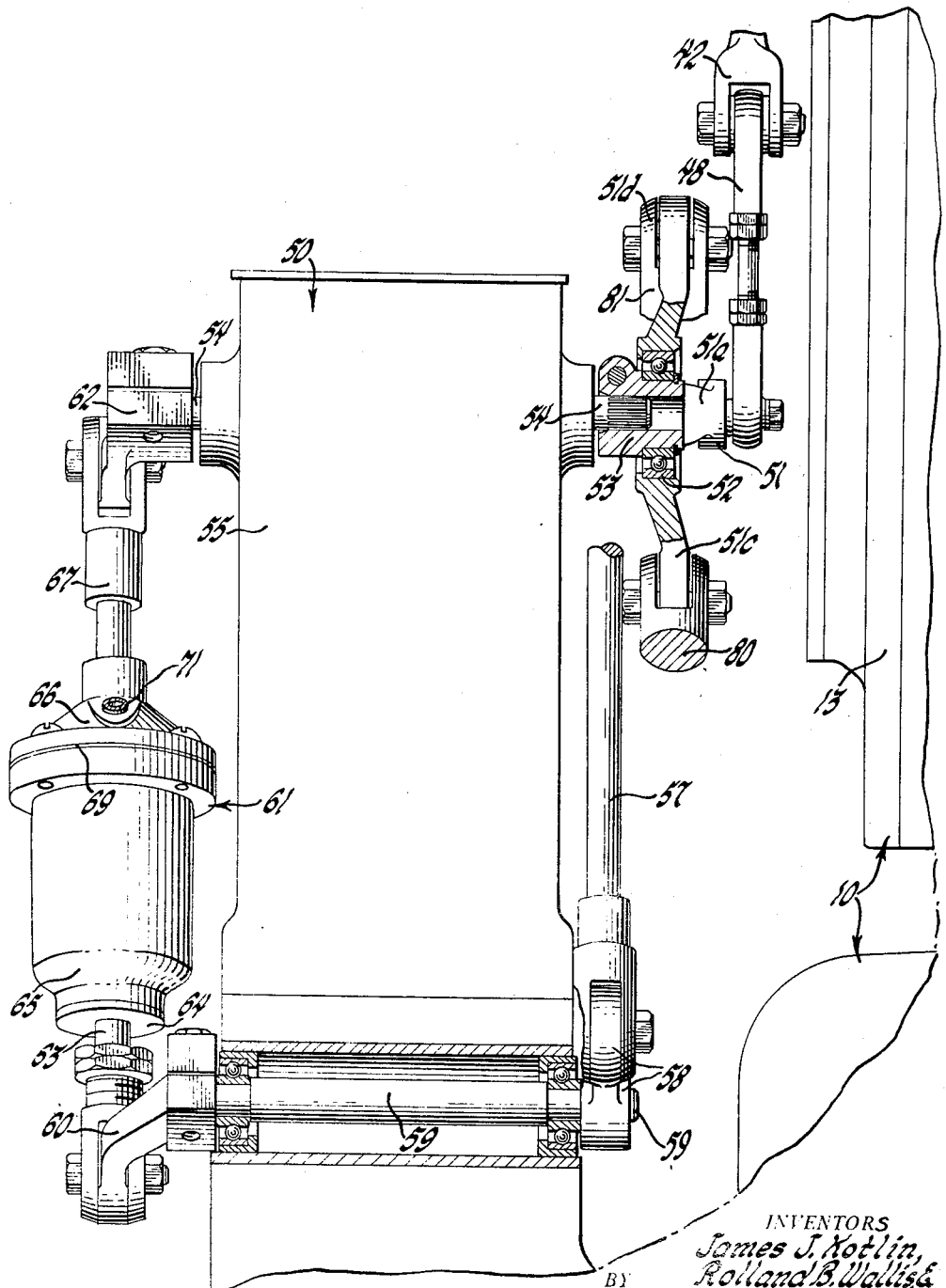

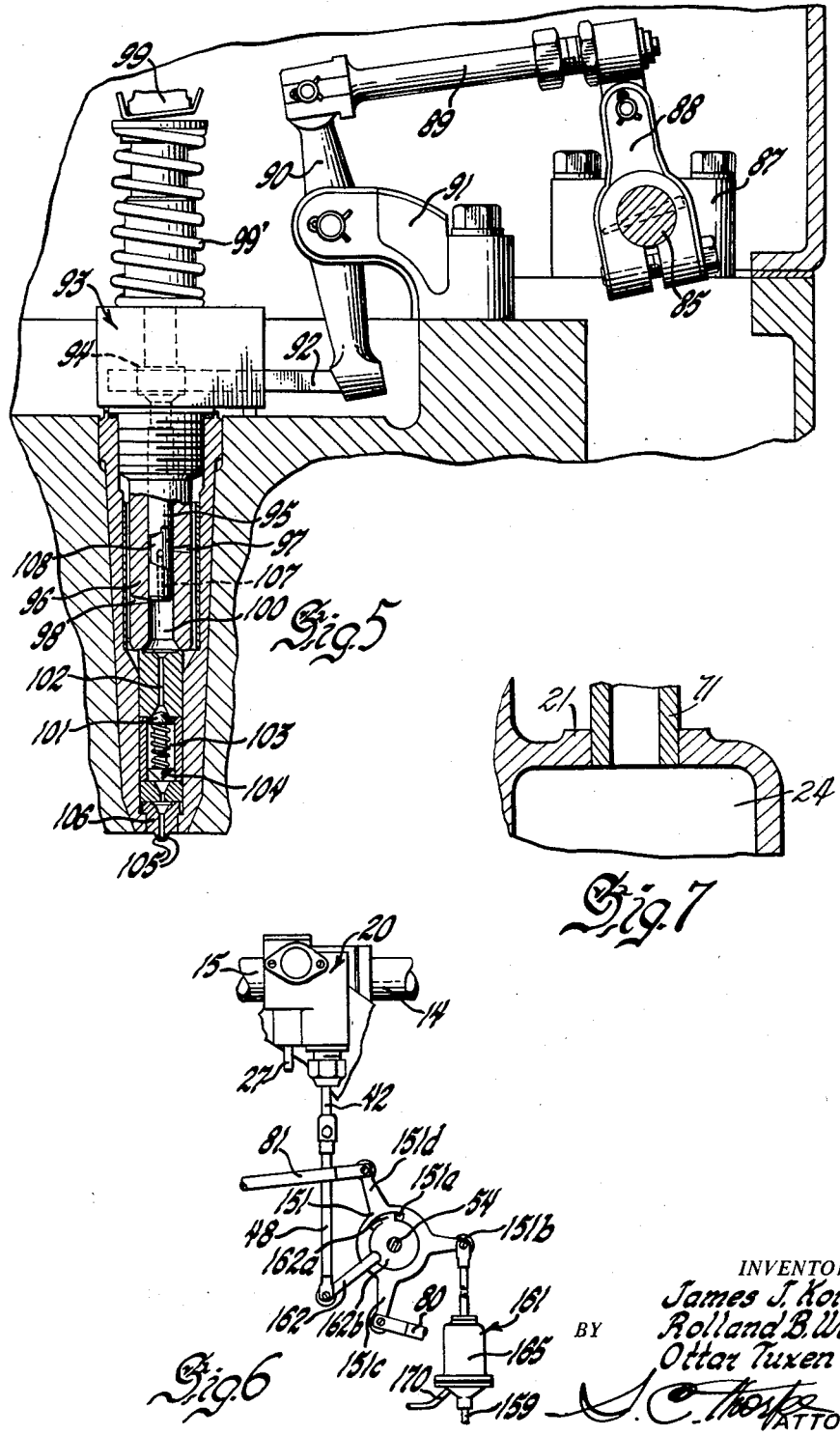

2,929,366

FUEL CONTROL MECHANISM FOR A DUAL FUEL ENGINE

James J. Kotlin, Downers Grove, and Ottar Tuxen, Chicago, Ill., and Rolland B. Wallis, Lakewood, Ohio, assignors to General Motors Corporation, Detroit, Mich., a corporation of Delaware Application December 3, 1956, Serial No. 625,699

15 Claims. (Cl. 123—27)

The invention relates to an internal combustion engine of the dual fuel type, and to fuel supply control mechanisms for such engines whereby the engine is adapted to operate on either gas fuel, with or without the injection of a small amount of oil fuel to cause ignition, or to operate on oil fuel injection exclusively when gas fuel is not available.

Dual fuel engines have great utility in certain installations such as sewage disposal plants and oil well drilling jobs where they can make use of low cost gas when such gas is available and can alternatively be run on oil fuel. Such applications usually require that the engine operate under relatively constant speed and load conditions notwithstanding fluctuations or termination of the gas supply. Consequently, it is common practice to provide such dual fuel engines with a governor mechanism normally operable through a suitable gas fuel control means to maintain the speed of the engine by modifying the gaseous fuel input to the engine in accordance with a particular governor speed setting, but operable in the event of a gas supply failure to automatically convert the engine from dual fuel to full oil fuel operation and to maintain the speed of the engine by adjustment of a suitable oil fuel control means. Such operation generally necessitates substantial fuel controlling travel of the governor output member with means for isolating separate portions of this movement from the separate gas and oil fuel control means. Such operation further requires means for maintaining the gas fuel control means in a closed position during full oil operation to prevent overcharging the cylinder should the gas supply return. These requirements are usually accomplished by means of lost-motion pickup actuating connections or by providing an oil fuel control having a relatively flat fuel supply characteristic, supplying either no oil or only a very small igniting charge of oil, during that portion of the governor movement which is normally operable to control the supply of the gas fuel. Although various types of ignition initiating devices may be used for operation of such dual fuel engines on gas, it has been found generally best to inject a small charge ("pilot injection") of fuel oil which ignites due to the compression temperatures and initiates the ignition of the main gas and air mixture.

The present invention contemplates an improved fuel control mechanism for a dual fuel engine operable in accordance with engine speed to meet the engine power demands and including a means sensitive to variations in the gas supply pressure to automatically convert the engine from gas to full oil operation upon a failure in the gas supply.

In isolated single engine installations where the governor is sensitive to both engine speed and load, the prior art fuel controlling mechanisms have been generally satisfactory. However, in certain applications where the engines are arranged for paralleled operation such as in engine-generator sets the engine speed is synchronized in accordance with the overall output speed of the entire system, i.e., with the line frequency. Consequently, if one engine of such a system should suffer a gas supply failure, the output of that particular engine could drop off to the point where the engine would actually shut down since the governor would be ineffective to convert the engine from dual fuel to full oil fuel operation. Hence, the instant invention has particular application to such paralleled dual fuel engine installations, but it is also applicable to single engine installations.

The foregoing and other objects, advantages and features of the invention will be more thoroughly understood from the following description of several illustrative embodiments having reference to the accompanying drawings, in which:

Figure 1 is a front elevational view of a V-type dual fuel engine having a fuel control mechanism constructed in accordance with the invention;

Figure 2 is an enlarged view of a portion of Figure 1 with portions thereof broken away and in section to show the details of the gas inlet valve;

Figure 3 is an enlarged view of another portion of Figure 1 with portions thereof broken away and in section to show certain details of the fuel control linkage;

Figure 4 is a view similar to and taken substantially on the line 4—4 of Figure 3;

Figure 5 is an enlarged sectional view showing a fuel injector pump mounted in a cylinder head and showing a portion of the oil fuel supply controlling linkage mechanism;

Figure 6 is a somewhat diagrammatic view of a portion of a modified form of the invention; and Figure 7 is a view similar to a portion of Figure 2 showing a slightly modified form of the invention.

Referring more particularly to the drawings, Figure 1 shows a V-type internal combustion engine 10 of the compression ignition dual fuel type. Two cylinder head covers 11 and 12 are provided for the right and left hand cylinder banks of the engine, respectively, and serve to house suitable valve and fuel injecting actuating mechanisms, not shown. A cover member 13 is also mounted on the front of the engine and houses suitable camshaft driving gears, not shown, and a conventional engine overspeed shutdown mechanism, partially indicated at 31, 32 and 33. Two gas distribution manifolds 14 and 15 serve to deliver gaseous fuel to the individual cylinders through branches indicated at 16 and 17, respectively, and are connected at the front of the engine to a combined gas shutoff and throttle valve mechanism 20 mounted on the gear cover 13. An engine governor 50 is also mounted on the engine and is adapted to be driven thereby. This governor may be of any conventional type, but in the embodiment shown is preferably of a type having a speed synchronizing mechanism, i.e., the Woodward UG8 governor.

As shown in Figure 2 the gas shutoff and throttle valve mechanism 20 comprises a casing 21 having an inlet chamber 22 connectible through an inlet port 23 to a gas supply line, not shown, an intermediate chamber 24, and an outlet chamber 25 connected to the gas distribution manifolds 14 and 15. An opening 26 in the casing interconnects the inlet and intermediate chambers 22 and 24 and forms a valve seat 26' for a poppet type shutoff valve 27. The valve 27 is biased towards its closed position by a spring 28 and has a valve stem 29 reciprocably mounted in and projecting from the valve casing. The end of valve stem 29 is adapted to engage an actuating cam surface 30 formed on a cam lever 31 mounted on the end of a shaft 32 which is in turn pivotally mounted in the camshaft gear cover. During engine starting procedures, a handle 33 is used to manually rotate the cam lever 31 in a counterclockwise direction, as viewed in Figure 2, thereby actuating the valve 27 between its closed and opened positions, shown in full and broken lines, respectively. The shaft 32 is a part of the engine overspeed shutdown mechanism and is rotatable in a clockwise direction upon an engine overspeed thus carrying the cam surface 30 out of engagement with the end of the valve stem and permitting the valve 27 to close shutting off the gas fuel supply to the engine. Such a conventional overspeed shut-down mechanism is, of course, operably connected to the oil fuel injection mechanism to shut off the supply of oil fuel under such overspeed operating conditions.

When the valve 27 is in its open position, the flow of gas from the intermediate chamber 24 through the valve outlet chamber 25 and to the gas distribution manifolds 14 and 15 is regulated by a governor-controlled throttle valve 35. This throttle valve comprises a cup-shaped valve cage member 36 projecting through the outlet chamber and sealably mounted in axially spaced and aligned openings 37 and 38 provided in the valve casing. The cup-shaped end of the cage member 36 has a plurality of radial ports 39 opening onto the valve outlet chamber 25 and has an axial port 40 opening on the intermediate valve chamber. The port opening 40 defines an annular valve seat 40′ reciprocably embracing a spool type throttle valve member 41 which is contoured to provide proper speed-load characteristics. The valve member 41 is suitably connected to an actuating rod 42 which is reciprocably mounted in the closed end of the cage member 36 and is operably connected to the engine governor 50. During normal dual fuel operation, the valve member 41 is shifted upwardly to a governor-controlled intermediate opened position from a first closed engine-shutdown position, shown in full lines in Figure 2, in which an annular boss 43 formed thereon sealingly engages the valve seat 40′.

A linkage mechanism operably interconnects the gas and oil fuel supply control mechanisms with a speed controlling output member of the engine governor. In accordance with the invention, this linkage mechanism is automatically adjustable upon a failure of the gas supply to advance the oil fuel control mechanism to a full oil operating position corresponding to the normal engine speed maintaining setting of the governor and simultaneously moves the valve member 41 further upwardly from its intermediate open position to a second closed position, indicated in broken lines, thereby bringing a second annular boss 44 formed thereon into substantially gas sealing engagement with the port opening 40. It will also be noted that in the illustrative embodiment, the valve member 41 is slidably mounted on the actuating rod 42 between two snap rings 46 and 47 and is biased by a spring 45 to provide a limited lost motion connection permitting limited movement of rod 42 from its full line position to its position shown in broken lines. This limited movement permits actuation of the linkage mechanism and hence actuation of the oil fuel control mechanism from a no-oil-fuel engine shut-down position to a pilot fuel supplying position prior to the opening of the gas throttle valve.

As best shown in Figures 3 and 4, the end of the valve actuating rod 42 distal from the valve member 41 is pivotally connected to one end of an adjustable link 48 which is in turn pivotally connected at its opposite end to one arm 51a of a multiple arm bell crank lever 51. A bearing 52 pivotally mounts the bell crank lever 51 on a hub member 53 which is carried by and forms an extension of one end of a governor power shaft 54; the shaft 54 extending through and projecting outwardly from both the front and the rear of the governor housing 55. A second arm 51b of the bell crank lever 51 is pivotally connected to one end of a link 57 which is pivotally connected at its opposite end to a lever arm 58 connected to a rearwardly projecting end of a shaft 59 journaled in the governor base. A second lever arm 60 is secured to the opposite frontwardly projecting end of the shaft 59 and is pivotally connected to one end of a gas pressure adjustable link 61. The distal end of the link 61 is pivotally connected to a lever arm 62 secured to the front end of the governor power shaft 54.

The gas pressure adjustable link 61 comprises an adjustable rod member 63 which is pivotally connected at its lower end to the lever arm 60. The opposite end of the rod 63 is slidably embraced by a crosshead bearing member 64 carried by one end of a cylinder 65 which is closed at its opposite end by a head 66. The head 66 is in turn secured to one end of a second rod 67 which is pivotally connected at its opposite end to the lever arm 62. A cup-shaped plunger element 68 is secured to the end of the rod 63 projecting within the cylinder 65 and has side walls in radially spaced relation to the crosshead member 64 and the cylinder 65. This plunger is sealed with respect to the closed head end of the cylinder by a flexible seal diaphragm 69 secured centrally to the end face of the plunger and peripherally between the cylinder and the head to define an expansible chamber 70 therebetween. This expansible chamber is connectible through a suitable pressure line 71 to the gas supply line. This connection to the gas supply line may be to the valve inlet chamber 22 above the shutoff valve 27, as shown in Figures 1 and 2. In certain installations where it may be desirable to operate the engine on oil fuel alone even though a sufficient gas supply is available, this connection of the line 71 may be made to the intermediate chamber 24, as shown in Figure 7.

Gas pressure supplied to the expansible chamber 70 is normally operable to actuate the plunger and the cylinder in opposite directions thereby elongating the link 61 in opposition to a spring 72 compressibly interposed between the plunger 68 and the opposite end of the cylinder; the side walls of the plunger acting as an external spring guide and serving to limit the axial elongation of the link 61. When the link 61 is thus actuated by the gas supply pressure, its elongated length is effective through the interconnecting linkages to actuate the bell crank lever 51 to a dual fuel operating range of travel in which the governor is effective to modulate the gaseous fuel supplying opening of the gas throttle valve 35 while the oil fuel control mechanism is limited to a pilot injection operating condition as explained in greater detail below.

The oil fuel control mechanisms for the two cylinder banks are substantially identical and include two links 80 and 81 which operably interconnect two lever arms 51c and 51d, respectively, of the bell crank lever 51 with two lever arms 83 and 84 which are secured to the ends of two control shafts 85 and 86 extending longitudinally of each cylinder head. As best shown in Figure 5, the shafts 85 and 86 are suitably journaled in a plurality of brackets 87 spaced longitudinally thereof and have a plurality of longitudinally spaced lever arms 88 secured thereto. Each of the lever arms 88 is pivotally connected at its outer end to a floating link 89 which is in turn pivotally connected at its opposite end to the upper end of a lever 90. The lever 90 is pivotally mounted intermediate its ends by a bracket 91 and has a pivotal connection at its lower end with the fuel supply controlling rack 92 of a unit fuel injector 93.

In the embodiment shown in Figures 1–5, the unit fuel injectors 93 are preferably of the type shown and described in United States Patent 2,686,503 issued to Virgin C. Reddy and Roger H. Harrison and entitled "Dual Fuel Engine." The teeth of the rack 92 drivingly engage a pinion 94 which is slidably and non-rotatably mounted on a pump plunger 95. The plunger 95 is reciprocably mounted in a bushing 96 defining a pump cylinder and having an upper port 97 therein serving as a combined oil inlet and bypass port and a lower port serving as an oil pressure relief port. Downward actuation of the plunger 95 in timed relation to the engine is accomplished by a conventional actuating mechanism indicated generally at 99, and a spring 99′ serves to return the plunger upwardly to its original position. During the downward pumping stroke, a certain quantity of fluid is entrapped in a pumping chamber 100 intermediate the end of the plunger and a one-way check valve 101 controlling fluid discharge through a restricted orifice 102. The downward movement of the plunger forces a portion of this entrapped oil past the check valve 101 into a chamber 103 where the pressure of this oil is effective to lift a conically headed valve member 104 thereby injecting the oil charge to the engine cylinder through suitable orifices 105 provided in an injector nozzle 106. The plunger 95 is provided with an axially extending passage 107 which interconnects its pumping chamber end surface with a scroll-relieved portion 108 longitudinally spaced from such end. The scroll-relieved portion 108 and the passage 107 coact with the fluid inlet and bypass port 907 and the pressure relief port 98 in the manner described in the aforementioned patent to control the timing and duration and, hence, the quantity of oil injected into the engine cylinder per operating cycle in accordance with the rack-controlled rotational position of the plunger.

The contour of the scroll on the injector plunger is formed so that in one rotational position of the plunger 95 the injector is inoperative to deliver any oil fuel to the cylinder. This position of the plunger is achieved when the injector control racks and the associated linkage mechanism are actuated to their engine shutdown, no-fuel positions by manually rotating a lever 109 secured to the control shaft 86 in a clockwise direction as viewed in Figure 1 to an extreme limit position. After the engine has been shut down in this manner, release of the handle 109 permits the injector plungers 95 to return to either an initial pilot oil fuel supply position for dual fuel operation or to an engine idle oil fuel supply position for operation on oil fuel alone. These initial oil supply positions are dependent upon the effective length of the link 61 which is dependent upon the application of sufficient gas supply pressure to the chamber 70. A portion of this return movement is accomplished by the gas throttle valve spring 45 under either type of engine operation.

As indicated above, the governor is effective to control and maintain the speed of the engine under load by modulating the opening of the gas fuel throttle valve 35 whenever gas supply pressure is being applied to the expansion chamber 70; the contour of the scroll on each of the injector plungers 95 being such as to permit only limited pilot injection under such dual fuel operating conditions. However, when the gas supplied to the expansion chamber 70 is below a predetermined necessary engine operating pressure for any reason, the spring 72 is effective to shift the plunger 68 towards the head end of the cylinder 65 thus reducing the effective length of link 61. This results in rotation of the bell crank lever 51 actuating the gas throttle valve 35 to its second closed position and shifting the oil fuel control mechanism to a second operating range in which the governor is effective to control the supply of oil to the engine cylinders for operation on oil alone between an engine idle, no-load condition and a full speed and load condition; the injector control rack linkages rotating the individual plungers beyond their pilot injection limiting range into a full oil operating range where the scroll contouring effects the delivery of an oil charge sufficient to maintain the desired engine operating conditions.

In the modified form of the invention shown in Figure 6 the actuating rod 42 of the gas throttle valve mechanism 20 is connected by the link 48 to one end of a lever 162. The opposite end of the lever 162 is enlarged and provides a substantially cylindrical hub 162b which is secured to the governor output shaft 54 and pivotally mounts a multiple-arm bell crank lever 151. The bell crank lever 151 has an axially extending groove 151a formed therein which coacts with a lug 162a formed on the mounting hub 162b to provide a limited lost motion operating connection between the levers 162 and 151. One arm 151b of the bell crank lever is pivotally connected to one end of an adjustable link 161 similar to the link 61 in the previously described embodiment. The link 161 includes a gas pressure responsive device 165 intermediate its ends which has a gas pressure supply line 170 connected thereto. The opposite end of the link 161 is pivotally connected to the governor base as indicated at 159. The bell crank lever also has two lever arms 151c and 151d which are pivotally connected to links 80 and 81, respectively, of the oil fuel control mechanism.

In this embodiment during dual fuel operation, the governor output shaft directly controls the gas throttle valve lift or opening while the gas pressure delivered to the pressure device 165 of the adjustable link 161 is effective to elongate the link 161 thereby rotating the bell crank lever 151 in a counterclockwise direction to a position corresponding to a pilot charge supplying position for the unit injectors irrespective of rotation of the governor power shaft 54. In this dual fuel operating position of the bell crank lever, the side walls of the groove 151a will be free of the lug 162a. Upon a gas supply failure, the pressure device 165 is effective to shorten the link 161 thereby rotating the bell crank lever 151 in a clockwise direction until the left hand wall of the groove 151a contacts the lug 162a formed on the governor shaft mounted lever 162. This rotation of the bell crank in relation to the governor output shaft shifts the injector control mechanism to obtain the oil fuel input required for full oil engine operation. The scroll contouring on the individual injector plungers utilized in this embodiment is preferably formed so that a somewhat greater rotation of the governor power shaft is required to maintain the desired engine speed during oil fuel operation than that required during dual fuel operation. This additional rotation permits shifting of the gas throttle valve to its second closed position during such oil fuel operation.

From the foregoing description it will be seen that the invention provides a dual fuel control mechanism adapted to utilize substantially the full governor operating range during both dual fuel and oil fuel operation thus permitting standard governor mechanisms to be utilized with greater sensitivity of fuel control response. The invention also provides a dual fuel control mechanism particularly adapted for use with engines arranged for parallel operation wherein the individual engine governors are synchronized in accordance with the overall output speed of the entire system, since the control mechanism of the invention is sensitive to variations in the gas supply pressure to automatically convert the engine from dual fuel (or gas only) operation to full oil operation upon a failure in the gas supply.

While only two specific embodiments of the invention have been disclosed for the purposes of illustration, it will be appreciated that various modifications may be made without departing from the spirit and scope of the invention as defined in the following claims.

We claim:

1. In a dual fuel internal combustion engine, means for supplying gaseous fuel to the engine from a source subject to varying delivery pressures including a conduit connecting said source to the engine and a throttle valve controlling gaseous flow through said conduit and movable in opposite directions toward closed positions from an intermediate full-open position, oil fuel supply means including an oil fuel injection pump operable to supply oil fuel to said engine in timed relation to the engine, said fuel injection pump having a pump control element movable in opposite directions from an intermediate position and operable to control the quantity and timing of oil fuel delivery from said pump, said control element having means for varying the start and finish of fuel injection to supply a limited and substantially constant amount of oil fuel sufficient to cause ignition of gas and air supplied to the engine when said element is moved in one direction from said intermediate position and having means for varying the start and finish of oil fuel injection to vary the duration and amount of fuel oil supplied to the engine when said element is moved in the opposite direction from said intermediate position for operation of the engine on oil fuel only, an engine speed responsive governor member linked to positively effect movements of said gas throttle valve from its full-open position in response to engine speed changes from a predetermined speed and being linked to positively effect corresponding movements of said injector control element, and gas supply pressure responsive means operable to modify the linking connection intermediate the governor member and said injector pump control element to shift said valve to one of its closed positions and to shift said control element past its intermediate position in said opposite direction whenever the gas supply pressure falls below a predetermined gas pressure.

2. In a dual fuel engine, means for supplying gaseous fuel to the engine from a source subject to varying delivery pressures including a gas conduit connecting said source to the engine and a throttle valve controlling gas flow through said conduit and movable between a closed position and a full-open position, an oil fuel injection pump operable to supply oil fuel to said engine in timed relation thereto, said fuel injection pump having a pump control element movable between a first position adapted to render said fuel pump inoperable to supply sufficient oil fuel to said engine to support engine operation, a second position rendering said fuel pump operable to supply a limited amount of oil fuel sufficient to support engine idling operation, and a third position rendering said fuel pump operable to supply an amount of oil fuel sufficient to support engine operation at full load and speed conditions, said control element having means for varying the start and finish of oil fuel injection thereby increasing the duration and amount of fuel oil supplied to the engine when said element is moved intermediate its second and third positions for operation of the engine on oil fuel only, an engine speed responsive governor means having a member movable in response to engine speed changes from a predetermined speed, a first linkage means operably connecting said throttle valve to said governor member to positively effect movements of said gas throttle valve from its full-open position in response to engine speed changes from said predetermined speed, a second linkage means operable to connect said injector control element to said governor, and means responsive to gas supply pressure and operable to modify the connections established by said first and second linkage means intermediate the governor member, the throttle valve, and said injector pump control element, said gas pressure responsive means being normally operable whenever the gas supply pressure is in excess of a predetermined pressure to shift said gas throttle valve to its open position and to shift said control element to said first position, and operable whenever said gas supply pressure falls below said predetermined pressure to shift said gas throttle valve to its closed position and to shift said control element to a position intermediate its second and third oil fuel supplying positions.

3. In a dual fuel internal combustion engine, means for supplying gaseous fuel to the engine from a source subject to varying delivery pressures, said means including a gas conduit connecting said source to the engine and a throttle valve movable in opposite directions toward closed positions from an intermediate full-open position, an oil fuel supply pump operable to supply oil fuel to said engine and having a pump control element operable to supply a limited and substantially constant amount of oil fuel sufficient to cause ignition of gas and air supplied to the engine when said element is moved in one direction from and intermediate position and operable to vary the duration and amount of fuel oil supplied to the engine for operation of the engine on oil fuel only when said element is moved in the opposite direction from said intermediate position, linkage means operable to interconnect said throttle valve and said control element, an engine speed responsive governor having a member operable on said linkage means to positively effect movements of said gas throttle valve and said control element in response to engine speed changes from a predetermined speed, and a gas supply pressure responsive means operable on said linkage means whenever the gas supply pressure is above a predetermined pressure to shift said throttle valve to an open position and to shift said control element in said one direction past its intermediate position and operable whenever the gas supply pressure falls below said predetermined pressure to shift said throttle valve to one of its closed positions and to shift control element past its intermediate position in said opposite direction.

4. In a dual fuel engine, a fuel control mechanism comprising, in combination, means for supplying gaseous fuel to the engine from a source subject to varying delivery pressures, said means including a gas conduit connecting said source to the engine and a throttle valve movable between a closed position and a full-open position, an oil fuel supply means having a control element movable to vary the duration and amount of fuel oil supplied to the engine, linkage means operably interconnecting said throttle valve and said control element, and a means responsive to the gas supply pressure associated with said linkage means and operable whenever the gas supply pressure is above a predetermined pressure to shift said throttle valve to an open position and to shift said control element to a first control position wherein said fuel oil supply means is operable to supply a limited amount of oil fuel sufficient to cause ignition of gas and air supplied to the engine, and said pressure responsive means being operable whenever the gas supply pressure falls below said predetermined pressure to shift said throttle valve to its closed position and to shift said control element to a second control position wherein said oil fuel supply means is operable to supply an amount of oil fuel sufficient for operation of the engine on oil fuel only.

5. In an internal combustion engine, a fuel control mechanism comprising means for supplying gaseous fuel to the engine from a source subject to varying delivery pressures including a gas conduit connecting said source to the engine and a throttle valve movable between a closed position and a full-opened position to control gaseous fuel flow to the engine, linkage means operably associated with said throttle valve and adapted to shift said throttle valve between its opened and closed positions, and a means responsive to the gas supply pressure associated with said linkage means and normally operable through said linkage means whenever the gas supply pressure is above a predetermined pressure to shift said throttle valve to an open position and operable whenever the gas supply pressure falls below said predetermined pressure to shift said throttle valve to its closed position.

6. In an internal combustion engine, a fuel control mechanism comprising conduit means adapted to supply gaseous fuel to the engine from a source subject to varying delivery pressures and including a throttle valve movable between a closed position and a full-opened position to control the flow of gaseous fuel to the engine, a governor means having a member movable in response to changes in engine speed from a governor established speed setting, linkage means operably interconnecting said throttle valve and said member whereby the opening of said throttle valve is normally controlled by the speed change responsive movement of said member, and a means responsive to the gas supply pressure associated with said linkage means and operable through said linkage means whenever the gas supply pressure is above a predetermined pressure to shift said throttle valve to a governor-controlled open position and operable whenever the gas supply pressure falls below said predetermined pressure to shift said throttle valve to its closed position irrespective of the movement of said governor member.

7. In a dual fuel internal combustion engine, means for normally supplying gaseous fuel to the engine, an oil fuel supply means operable to supply oil fuel to said engine in timed relation to the engine and including a movable control element operable in a first range of movement to limit the quantity of oil fuel supplied to said engine to an amount sufficient to cause ignition of the gas and air mixture normally supplied to the engine and operable in a second range of movement to vary the duration and amount of fuel oil supplied to the engine for operation of the engine on oil fuel only, and a gas supply pressure responsive means operable to shift said control element to its first range of movement whenever the gas supply pressure is above a predetermined gas pressure and operable to shift said control element to its second range of movement whenever the gas supply pressure falls below said predetermined gas pressure.

8. The combination as set forth in claim 7 including an engine speed responsive governor member operable to effect movements of said control element in response to engine speed changes from a predetermined speed whenever said control element is shifted by said pressure responsive means to its second range of movement.

9. In an internal combustion engine, means for supplying gas fuel to the engine from a source subject to varying delivery pressures including a gas conduit connecting said source to the engine, a first valve operable to control gas flow through said conduit and movable between a closed position and a fully-open position, a second valve operable to control gas flow through said conduit and movable between a closed position and a full-open position, engine oil fuel supply means operable to supply oil fuel to the engine in timed relation to the engine and including a movable control element operable in a first range of movement to limit the quantity of oil fuel supplied to the engine to an amount sufficient to cause ignition of the gas and air normally supplied to the engine and operable in a second range of movement to vary the duration and amount of oil fuel supplied to the engine for operation of the engine on oil fuel only, linkage means operably interconnecting said first valve and said control element, a first engine speed responsive governor means including an output member associated with and operable through said linkage means to effect movements of said first valve and said control element in response to engine speed changes from a predetermined speed, said injector control element being normally maintained in its first range of movement, a gas supply pressure responsive means operable to modify said linkage means intermediate said first valve, said governor member, and said control element to shift said valve member to its closed position and to shift said control element to its second range of movement whenever the gas supply pressure falls below a predetermined gas pressure, and a second engine speed responsive means associated with said second valve and said fuel supply means and operable thereon in case of engine speed in excess of a predetermined maximum to move said second valve to its closed position and to render said fuel supply means incapable of supplying oil fuel to said engine.

10. In an internal combustion engine, means for supplying gas fuel to the engine from a source subject to varying delivery pressures including a gas conduit connecting said source to the engine, a valve means operable to control gas flow through said conduit including a first valve and a second valve independently movable between closed and full-open positions, a first engine speed responsive governor means including an output member movable in response to the engine speed changes from a predetermined speed, linkage means operably interconnecting said first valve and governor output member to effect movements of said first valve in response to the engine speed changes from the predetermined speed, a gas supply pressure responsive means operable to modify said linkage means to shift said member to its closed position whenever the gas supply pressure falls below a predetermined gas pressure, and a second engine speed responsive means associated with said second valve and said fuel supply means and operable thereon to move said second valve to its closed position whenever the engine exceeds a predetermined maximum speed.

11. In an internal combustion engine, means for supplying gas fuel to the engine from a source subject to varying delivery pressures including a gas conduit connecting said source to the engine, valve means operable to control gas flow through said conduit, a first engine speed responsive governor means including an output member associated with and operable on said valve means to control gas flow through said conduit in accordance with changes in engine speed from a predetermined governor speed setting, a gas supply pressure responsive means associated with and operable on said valve means to prevent gas flow through said conduit whenever the gas supply pressure falls below a predetermined gas pressure, and a second engine speed responsive means associated with and operable on said valve means to prevent gas flow through said conduit whenever the engine exceeds a predetermined maximum speed.

12. In an internal combustion engine, means for supplying gas fuel to the engine from a source subject to varying delivery pressures including a gas conduit connecting said source to the engine, a first valve operable to control gas flow through said conduit between a closed position and a full-open position, a second valve intermediate said first valve and said engine and operable to control gas flow through said conduit between a closed position and a full-open position, engine oil fuel supply means operable to supply oil fuel to the engine in timed relation to the engine and including a movable control element operable in a first range of movement to limit the quantity of oil fuel supplied to the engine to an amount sufficient to cause ignition of the gas and air normally supplied to the engine and operable in a second range of movement to vary the duration and amount of oil fuel supplied to the engine for operation of the engine on oil fuel only, linkage means operably interconnecting said second valve and said control element, a first engine speed responsive governor means including an output member associated with and operable through said linkage means to effect movements of said second valve and said control element in response to engine speed changes from a predetermined speed, said injector control element being normally maintained in its first range of movement, a gas supply pressure responsive means operable to modify said linkage means intermediate said second valve, said governor member and said control element to shift said second valve to its closed position and to shift said control element to its second range of movement whenever the gas supply pressure intermediate said first and second valves falls below a predetermined gas pressure, and means associated with and selectively operable to shift said first valve between its closed and full-opened positions thereby shifting said engine between its oil-fuel-only and dual-fuel operating conditions respectively.

13. The combination as set forth in claim 12 in which said last-mentioned means includes a second engine speed responsive means associated with said first valve and said fuel supply means and operable thereon whenever the engine exceeds a predetermined maximum speed to move said first valve to its closed position and to render said fuel supply means incapable of supplying oil fuel to said engine.

14. In an internal combustion engine, means for supplying gas fuel to the engine from a source including a gas conduit connecting said source to the engine, a first valve operable to control gas flow through said conduit and movable between a closed position and a fully-open position, a second valve intermediate said source and said first valve, said second valve being operable to control gas flow through said conduit and movable between a closed position and a full-open position, a first engine speed responsive governor means including an output member associated with and operable to effect movements of said first valve in accordance with engine speed changes from a predetermined governor speed setting, and means responsive to the gas supply pressure in said conduit intermediate said valves and operable to shift said first valve to its closed position whenever the gas supply pressure intermediate said valves falls below a predetermined gas pressure, and means associated with and selectively operable to shift said second valve between its closed and full-opened positions thereby shifting said engine between its oil-fuel-only and dual-fuel operating conditions respectively.

15. The combination as set forth in claim 14 in which said last-mentioned means includes a first engine speed responsive means associated with said second valve and said fuel supply means and operable thereon whenever the engine exceeds a predetermined maximum speed to move said second valve to its closed position, and to render said fuel supply means incapable of supplying oil fuel to said engine.

References Cited in the file of this patent

UNITED STATES PATENTS 2,612,145      Steven et al. _____ Sept. 30, 1952